United States Patent [19]

Petersen et al.

[11] 4,124,665

[45] Nov. 7, 1978

[54] METHOD OF MAKING A TUNGSTEN CARBIDE BODY

[75] Inventors: Donald H. Petersen, Dallas; Warren C. Schwemer, Arlington, both of Tex.

[73] Assignee: Advanced Technology Center, Inc., Dallas, Tex.

[21] Appl. No.: 775,668

[22] Filed: Mar. 8, 1977

Related U.S. Application Data

[63] Continuation-in-part of Ser. No. 470,426, May 16, 1974, abandoned.

[51] Int. Cl.$^2$ ............................................. C04B 35/56
[52] U.S. Cl. ......................................... 264/28; 106/43; 264/29.6; 264/29.7; 264/63; 264/65; 264/66; 264/67; 423/440
[58] Field of Search ....................... 264/66, 63, 65, 28, 264/29.6, 29.7, 67; 106/43; 423/440

[56] References Cited

U.S. PATENT DOCUMENTS

| | | | |
|---|---|---|---|
| 2,543,235 | 2/1951 | Dreyer et al. | 264/67 |
| 2,593,943 | 4/1952 | Wainer | 264/63 |
| 3,933,984 | 1/1976 | Kimura et al. | 423/440 |
| 3,960,768 | 6/1976 | Ripperger et al. | 264/29 |

Primary Examiner—Robert F. White
Assistant Examiner—John A. Parrish
Attorney, Agent, or Firm—James M. Cate

[57] ABSTRACT

The method of preparing very dense tungsten carbide bodies. A substantially stoichiometric mixture is prepared from tungsten particles and a carbon precursor, the precursor being a vinylidene chloride based polymeric material such as SARAN. A green body is pressed from the mixture, and said body is initially heated at a controlled rate to decompose on the order of 20% of the polymeric material, providing HCl gas which reacts with oxide contaminants on the metal particles to provide a clean, reactive metal surface for later reaction with the carbon. An intermediate baking step is provided to controllably evolve the gaseous products that result from continued decomposition of the polymeric material. After subsequent heating to 800°–1300° C, the body may be cooled to room temperature and machined to provide threads, apertures or the like. When the body is subsequently heated to about 2000° C, it shrinks to provide a very hard, dense body with a typical density between 14 and 15 g/cc.

18 Claims, No Drawings

METHOD OF MAKING A TUNGSTEN CARBIDE BODY

This is a continuation-in-part of co-pending application Ser. No. 470,426 entitled "Method of Making a Tungsten Carbide Body" filed May 16, 1974 and assigned to the same assignee and now abandoned.

This invention relates to the method of making very dense metallic carbide bodies, and more particularly it relates to the making of tungsten carbide bodies.

The high-temperature properties and the chemical inertness of standard commercial tungsten carbide bodies which have been made with a cementing technique are, for the most part, limited by the binder which is used to hold the bodies together. It is natural, therefore, that it has been attempted in the past to make improved tungsten carbide bodies by eliminating as much binder as practicable and even sometimes eliminating a binder altogether. Such binderless tungsten carbides would be expected to have superior properties, except that they have also had a characteristic brittleness. It is well known, also, that carbide powders are difficult to sinter to very high densities. Tungsten carbide will not sinter together into a sufficiently strong body when it is heated in the pure form. To circumvent such difficulties, at least some sintering aid or binder (usually cobalt, nickel or chromium) is typically used to improve the sintering property of metallic carbides. These binders offer the added feature of improving performance by making cemented tungsten carbides more ductile in commercial practice. Such carbides are prepared by the reaction of the carbide-forming metal with carbon, usually from petroleum coke or charred sugar, at 1000° to 1600° C. A tungsten carbide product from this reaction is then milled, and the powders are blended with the cementing agent, subsequently compacted, and then densified by heating at sintering temperatures. Without the binder, sintered tungsten carbide densities are generally limited to about 11g/cc, which are not satisfactory for most uses.

If relatively large, high density bodies of tungsten carbide are desired, the two techniques which are most typically used are those which employ arc fusion and hot pressing. Both of such techniques result in severe grain growth problems, however, and the hot pressing technique is rather difficult and expensive. A vapor deposition technique for making stoichiometric carbide filaments (e.g., silicon carbide) is also known, but that technique is deemed to be impractical for large parts.

Accordingly, it is an object of this invention to provide a method whereby a substantially stoichiometric carbide of tungsten can be formed without the requirement for a binder.

Still another object is to provide a method of making very dense tungsten carbide bodies.

An additional object is to provide a method wherein a polymeric carbon source undergoes a synergistic reaction with tungsten while giving no ditungsten carbide ($W_2C$), which is a product that is advantageously avoided when possible.

In general, the process of this invention begins with mixing finely divided particles of metallic tungsten with a vinylidene chloride-based polymer, such as Saran, as a carbon precursor. The proportion of the constituents is substantially stoichiometric, although it may still be satisfactory if it is, for example, very slightly low on carbon, as will be discussed in more detail in the specific description of the process hereinbelow. The mixture is intimately blended and then subsequently compressed to form a self-supporting green body of a desired shape. The green body is then heated at a rate such that relatively rapid dehydrohalogenation occurs without any melting of the polymeric material. The evolution of HCl serves to provide a cleansing agent to remove the surface contamination of oxides which are inevitably (and undesirably) present on the metallic powder, e.g., tungstic oxide ($WO_3$). For example, HCl reacts with $WO_3$ to give the volatile oxychlorides $WO_2Cl_2$ and $WOCl_4$. After a weight loss of at least 20% has been accomplished by this initial heating to evolve HCl, the green body is subsequently heated to a higher temperature to remove the oxychlorides that will form as the Hcl reacts with the oxides. After the body has experienced approximately a 50% weight loss, there will exist very active and clean metal particles dispersed in a reactive carbon matrix. The weight loss percentages (20% and 50%) in this case and in other instances hereinafter are based upon the initial weight of the polymeric material unless otherwise indicated. Subsequently heating to a temperature within the range of about 800°–1050° C. will effect carburization to the monocarbide, without the concurrent formation of any less desirable carbides, e.g., ditungsten carbide ($W_2C$). After this last heat treatment, the body is stable and it may be removed from a furnace, but it is still soft enough that it can be machined or processed in a desired manner. For example, it may be desired at this time to drill any desired holes in the partially completed body, knowing that the body will subsequently shrink when it is densified by being heated at densifying temperatures; hence, the final size of the holes will be less than the size of the drilled holes. While a certain amount of care is appropriate to protect the body from oxidation in this state, the body is not characterized as being extremely sensitive to contact with air. The partially completed body is subsequently returned to a furnace and heated at about 2000° C. for 10–100 minutes. A very dense tungsten carbide body is achieved, having a density of about 14.6 to 15g/cc and a diamond pyramid hardness of 1500–2000. There is no metallic binder employed in the process, and hence there is no binder left in the body; only a solid-state reaction is employed. Since there is no melting of the constituents at any stage of the process, there is no opportunity for large grain growth or distortion of the body shape.

The initial step in preparation of a very dense carbide body in accordance with the present invention is preparing a substantially stoichiometric mixture of particles of a suitable carbon precursor and finely divided metallic tungsten particles. Said suitable carbon precursor is a vinylidene chloride-based polymeric material which thermally decomposes to form carbon. It has been found that carbon derived from vinylidene chloride is relatively free from the impurities usually found in carbon from natural sources, such as sugar. Exemplary precursors are: polyvinylidene chloride; a copolymer of vinylidene chloride and vinyl chloride (e.g., 80% PVDC and 20% PVC); and a copolymer of vinylidene chloride and acrylonitrile. All of these materials contain chlorine which is evolved during an intermediate step in the process in the form of hydrogen chloride. Suitable materials may be purchased commercially under the brand names Saran (which contains at least 80% polyvinylidene chloride) and Saran A (which contains 100% polyvinylidene chloride). If the carbon precursor is a copolymer of vinylidene chloride and, say acrylonitrile, it is believed that the vinylidene chloride should comprise at least 30% of the copolymer. Commercial materials are typically available in powdered form consisting of small particles or spheres. It is preferred that the plastic particles be rather fine, e.g., smaller than about 40 microns, such that they will pass through a 325 mesh sieve.

The tungsten particles should also be rather fine, and preferably they have a Fisher sub-sieve size of about one micron, i.e., the average size of the particles is about one micron. In such a mixture, the metal particles may actually range in size from 0.5 to 5 microns. Tungsten is inert to the hydrogen chloride which is evolved during the process.

The proportions of the starting materials are governed by the product to be obtained. The end product of the present process is tungsten carbide in which the proportions of its constituent elements are substantially stoichiometric, and preferably lying within a range in which the product may vary between an essentially stoichiometric product and a product no more than essentially one atomic percent low in carbon. In a product materially outside the above-stated range, the crystalline structure is not satisfactory. Thus, a produce with more than the stated amount of metal tends to exhibit qualities more like the metal than the carbide. Among other things, its chemical resistance is lowered; even more importantly, its hardness is decreased. On the other hand, an excess of carbon in the product changes the qualities of the product toward those of carbon or graphite, and both hardness and strength drop off.

For producing the product of constituency falling within the range stated above, there is employed a mixture of tungsten and the powdered polymeric material so proportioned that the desired product is obtained. Such a mixture is herein referred to as a mixture that is in the range varying between stoichiometric and one atomic percent low in carbon in that it yields, available for reaction with each other, tungsten and carbon atoms in such proportions. If it were practicable to employ a chemically pure polyvinylidene chloride ($CH_2$—$CCl_2$) and a pure tungsten powder, the proper amounts of each could be provided by weighing out, for example, 183.85 grams of tungsten and 48.47211 grams of polyvinylidene chloride (20.86% carbon precursor and 79.14% tungsten), carbon, hydrogen, chlorine, and tungsten having respective atomic weights of 12.011115, 1.008, 35.453, and 183.85. Since tungsten carbide in the WC form has an equal number of tungsten and carbon atoms, an initial mixture in which the carbon component is one atomic percent low is one having 183.85 grams of the metal and 11.765991 grams of the carbon component [12.011115−(12.011115×1/49)]. Thus, the term "atomic percent," as employed herein, means the percentage of the number of atoms of one constituent of a given weight of the product relative to the number of all atoms present in that weight of the product. In this case, 47.482886 grams of the polyvinylidene chloride is combined with 183.85 grams of tungsten, a ratio of 20.53% to 79.47%. As is known in the art, however, impurities will be present in both compounds. Particles of commercially available tungsten powder will include at least some oxides of tungsten, the quantity of oxides being greater in the case of smaller tungsten particles. In the polymeric material, there may be other than vinylidene chloride monomers present, and the process of its manufacture may leave in it impurities resulting from wetting agents, catalysts, etc. employed in polymerization.

Moreover, the process of decomposition of the polymer or copolymer component in the presence of the metal is complex and varies with slight differences in precursor purity and composition, tungsten particle size and degree of oxidation, and variations in the temperature progression. It is thus advisable to pyrolyze a precursor sample from a new batch in order to ascertain the carbon residue which can be expected. Also, it has been noted that there is some tendency to obtain slightly less carbon when the precursor is pyrolyzed alone. The age of the carbon precursor has also been found to have some effect on the production of carbides; moreover, old powders tend to harden, which may inhibit their mixing with the metal particles. As a prudent step, it is recommended that the precursor plasticity be empirically established at periodic intervals during an extended manufacturing program.

Accordingly, the preferred mixture is one in which the quantity of the carbon component of the precursor, relative to the quantity of metallic tungsten in the tungsten powder, is within the range extending between an essentially stoichiometric ratio and a ratio in which there is a deficiency of one atomic percent of the carbon, considering only the effective, reactive elements and not the impurities. Thus, when the term "stoichiometric" is used herein and in the appended claims in reference to the initial mixture (of carbon precursor and tungsten) as distinguished from the carbide end product, it refers to the ratio of the quantities of effective, mutually reactive carbon and metallic tungsten components, apart from any impurities or oxides which may be present. Because the variations in purities of the starting materials are not predictable and not feasibly ascertained, the actual proportion to be employed is most practically determined empirically. This is done by using admixed samples of the starting materials in the actual heaters or furnaces to be employed, then examining and analyzing the resulting product. The examples provided hereinbelow disclose typical proportions of various commercially available materials.

The initial mixture of particles of the metal and the carbon precursor may be achieved in a dry state or in a slurry. The particles should then be blended in order to achieve an intimate mixture. A preferred technique is blending in a ball mill with a benzene vehicle. It has also been found that uniformity in processing is enhanced if the milled mixture is freeze dried; a process which includes freeze drying has always been found to produce a free-flowing powder, but other liquids (e.g., pentane), and air drying steps no doubt would be satisfactory in some circumstances. In order to minimize contamination of the ingredients as they are being blended in a ball mill, it is advantageous to employ a mill which is lined with a material which is the same as the metal particles. Thus, the ball mill should be lined with tungsten, and tungsten carbide balls are best employed to accomplish the milling; in this manner, contamination from the walls is minimized.

It is important that the particles of polymeric material be processed such that they are as small as practicable in order to improve the blending characteristics. For example, fresh vinylidene chloridebased materials at room temperature are plastic in nature, and they are not readily reduced in size by normal mechanical grinding (as with a hammer mill); rather, they ae merely flattened. One way of satisfactorily grinding the polymeric material is to chill it so that it does not become gummy as it is worked. An effective technique of accomplishing the requisite chilling is to grind chunks of solid $CO_2$ ("dry ice") in a Raymond mill concurrently with the polymer.

After blending has been accomplished, it is appropriate to include a drying step, even if a slurry method was not employed for the intimate blending of the particles. Satisfactory drying is readily accomplished in a vacuum maintained at about 30 inches of mercury with a temperature less than 100° C. Typically, the drying step is carried out in a vacuum maintained at between 25 and 30 inches of mercury, with a temperature between 70° C. and 75° C.

The next step in the process of making a tungsten carbide body comprises compacting the dried powder mixture by either conventional pressing or hydrostatic compaction to form a self-supporting green body of a desired shape, e.g., a cylinder, a rod, a washer, an annular ring, etc. Typical compaction pressures should be at least 2000 psi, and pressures of about 7000 psi are preferred. Bodies compacted to a mere 2000 psi have been found to be less strong at the conclusion of the carburization process, as compared with those compacted at higher pressures. Some commercially available carbon precursors, and especially those more than a year or so old, are best pressed with a pressure of about 10,000 psi, whereas freshly prepared polymeric materials require considerably less pressure. Isostatic pressing is preferred over mechanical pressing. An upper limit on compacting pressure also exists as a consequence of the need to have sufficient pores in the body to permit controlled evolution of gaseous decomposition products during heating. This upper limit has been found to be about 30,000 psi for typical, commercially available materials; freshly prepared precursors will usually have lower pressure limits because their plasticity is greater. Because of their unpredictable variations, the characteristics of a particular batch of polymeric material are best determined empirically; one consequence of a compacting pressure which is too great is a puffing action that is manifested in the material when it is heated, as described hereinafter.

The next step comprises heating the green body at a commercially practicable rate (usually about 50° C. per hour) to a temperature at which a significant amount of dehydrohalogenation begins to occur, e.g., 115° C. Thereafter, heating should be slowed to, say, 1° C. per hour, to accomplish significant dehydrohalogenation in a controlled manner, such that there will be no melting of the polymeric material and no bulging of the body due to puffing or ballooning of the body occasioned by evolution of HCl gas. By the term "significant," it is meant that the dehydrohalogenation would produce a weight loss of 10-20% over a 24-hour time period. This can be readily accomplished by holding SARAN-A at 165° C. or SARAN 216 at 135° C. for 24 hours.

As previously discussed, the tungsten will inherently contain surface oxide contamination such as $WO_3$ and the reaction is as follows:

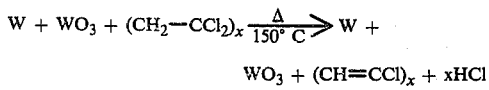

$$WO_3 + (CH=CCl)_x + xHCl$$

This baking at a moderate temperature to accomplish dehydrohalogenation should be continued until the green body has lost at least 20% of its weight, due to evolution of HCl (based upon the initial weight of the polymeric material). Care must be exercised to protect the pyrolyzing equipment from the HCl evolved during the reaction process. A simple and straightforward way of protecting the equipment from the HCl vapors is by means of reaction with a caustic material. Alternatively, a liquid nitrogen trap may be employed. The body can then be subsequently heated to a higher temperature, i.e., 250°-400° C., provided that heating is gradual enough so that the temperature differential within the body is held to no more than 5° C., whereby there will be no tendency to rupture the body due to egress of gases. Naturally, with relatively small bodies this baking step can be carried out more rapidly than with large bodies. This baking is continued until a weight loss of approximately 50% has been achieved, based on the initial weight of polymeric material. This further weight loss is accomplished at least partially by the continued generation of HCl gas, which is apparently quite beneficial in that it reacts with the always present oxides on the tungsten particles to form oxychlorides. This is illustrated as follows:

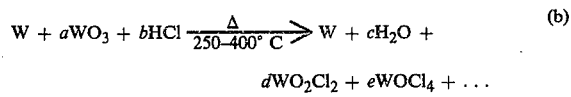

$$dWO_2Cl_2 + eWOCl_4 + \ldots$$

The oxychlorides will sublime at temperatures in the range of 250°-400° C. If this intermediate processing temperature should inadvertently be carried to high (e.g., 650° C.) prior to the conversion of all of the metallic oxides to the oxychlorides, there will be formed on the surface of the tungsten particles a thin layer of tungsten carbide. This is illustrated in the following equation:

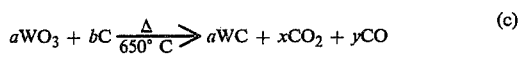

Formation of any metallic carbide at this early stage is deleterious in that it impedes the more thorough diffusion of carbon into the metal particles. That is, once any tungsten carbide forms at the surface of a tungsten particle, additional carbon has a difficult time passing through what is effectively a "case hardened" shell around the particle. Accordingly, it will be understood that the heating must take place at a controlled rate, if the ultimate density is to be achieved.

After the green body has experienced a weight loss of approximately 50% at temperatures below about 400° C., the heating may be accelerated to about 50° C. per hour until a temperature within the range of about 800°-1300° C. has been achieved. This last heating step is illustrated by the equation:

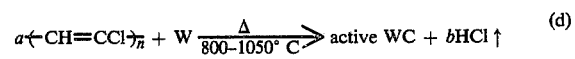

The duration of heating at this elevated temperature is not critical, as long as the entire body reaches the reaction temperature.

Having reached this stage of the process, the body is relatively stable, and it may even be removed from the furnace and handled. It will typically be substantially all tungsten carbide, but it is not as dense and hard as it will subsequently be after it has been further heated. That is, it is still soft enough so that it can be machined or threaded (to produce a bolt or the like), drilled or turned, etc. For example, if it is desired to form a small nozzle, it is possible to drill a hole in the body; shrinkage of the body during subsequent baking and shrinking is uniform, such that a smaller hole is achieved than was originally drilled. This can be particularly useful when a small nozzle intended for use as a spinnerette in a textile extrusion process is wanted. Because of the hardness and inertness of tungsten carbide, such nozzles also are desirable for spraying corrosive chemicals of fluids which contain abrasive particles.

The body at this stage of its processing is not characterized as being extremely sensitive to contact with air, so that exposure to air for a few minutes has not been ruinous; but a certain amount of care is appropriate to protect the body from prolonged exposure to air, e.g., several hours or days. Hence, if the body is to be stored for a significant period of time prior to heating at shrinking and densifying temperature, it is recommended that it be kept in an inert atmosphere, e.g., nitrogen. Excessive exposure to air will be manifested as a deterioration in the activity of the carbide product formed in reaction "b", which introduces difficulty in densification by heating.

Unlike the tungsten carbide formed from other precursors, the tungsten carbide formed in equation "b" is especially active, and it can be densified, by heating at about 2000° C., to very high densities. That is, binderless tungsten carbides from other materials usually have densities on the order of 11 g/cc, whereas tungsten carbide from selected vinylidene chloride based polymer precursors may be densified typically to densities in the range of 14–15 g/cc.

Accordingly, the next step in the process involves shrinking and densifying the body by heating the body at about 2000° C. for about 10 minutes. Densifying is typically accomplished in a vacuum of about $5 \times 10^{-3}$ Torr. If the body is to be heated to such a high temperature from room temperature, a modest heating rate should be employed in order to avoid "thermal shock" or rupture. Heating a body of about 200 grams from room temperature to 2000° C. in a period of a few hours has been successfully accomplished without introducing any structural problems. Naturally, specimen geometry will have an impact on suitable heating rates, and 4 to 10 hours are typical processing times. The body will definitely shrink, however, as it is heated to about 2000° C.; so it is desirable to heat it as slowly as seems to be economically feasible in order to insure structural integrity. If a temperature of less than 2000° C. is employed as the final densifying temperature, it will be necessary that a longer period of baking time be employed to accomplish full density. That is, at a final densifying temperature of about 1900° C., at least 45 minutes would be needed to achieve full density. At temperatures of less than 1900° C., the material's density has not been deemed to be satisfactory.

The following examples, in which all parts are by weight (unless otherwise specified), and all percentages of weight loss are with respect to the initial polymer weight, will further and more specifically illustrate the preferred embodiments of the invention.

EXAMPLE I

A copolymer with approximately 20 parts of vinylidene chloride to 1 part of acrylonitrile was prepared. This is similar to Dow's Saran-216. A mixture was prepared using 410 grams of this copolymer and 1790 grams of Fansteel tungsten having a Fisher sub-sieve size of 0.88 micron. This mixture was ball milled for 17 hours in benzene with a tungsten-lined mill using tungsten carbide grinding balls. It was then carefully dried to remove the benzene. Part of the powdered product was pressed into an annular disk at 3000 psi in a conventional ram mold. The OD was 6.36 cm; the ID 1.90 cm; and the thickness was 1.58 cm. The density of the preform was 3.71 g/cc; and it weighed 169.6 grams.

Next, the mandrel was removed and the compact was then isostatically compacted to 7500 psi. The resulting dimensions were: OD 5.50 cm; ID 1.67 cm; and thickness 1.44 cm. The density was 5.46 g/cc.

The compact was then heated to 115° C. in about 2 hours, and then heated at a rate of about ½ degree per hour to 134° C.; it was held at 134° C. for 24 hours to evolve HCl at a controlled rate so that the body did not puff. It was determined that a 20% weight loss had been achieved to this point. The body was then heated to 150° C. at a relatively slow rate of 1° C. per hour. This relatively slow initial heating improves the thermal conductivity and thereby reduces the problem of thermal shock during subsequent heating steps. (Thermal shock may be described as shrinking of the body exterior — due to evolution of HCl — at a rate faster than the interior shrinks, which causes cracking of the body.) Slow heating, such that the temperature differential within the body is held to no more than 5° C., will help prevent thermal shock.

The body was then heated to 320° C. over a period of about 20 hours, at a heating rate of about 10° C. per hour. Some HCl may still be evolved at this stage, but the primary purpose is to induce sublimation of the oxychlorides that form when the gaseous HCl reacts with the metallic oxides. To insure that all oxychlorides have been removed, a holding period of several hours is advantageously provided.

At this point, the body was relatively porous, consisting of pure tungsten in a matrix of carbon, plus some residual hydrogen, chlorine and nitrogen. Continued heating to 800°–1050° C. removes the hydrogen and chlorine and some nitrogen, and also results in the carburization of the tungsten by the reactive carbon. (Heating to a slightly higher temperature, e.g., 1300° C., will further insure the removal of any nitrogen impurity that may exist.) The heat was than shut off, and the sample was allowed to cool at its own rate, which required about 18 hours with this particular furnace. The sample was chemically stable and was safely removed from the furnace and measured. The OD was 4.86 cm, and ID 1.46 cm, and the thickness was 1.25 cm. The density was 6.86 g/cc; and the weight was 144.8 grams.

The body was then heated to 2000° C. in a vacuum of about $10^{-4}$ Torr, at an average heating rate of about 300° C. per hour. It was held at 2000° C. for about 90 minutes. (Of course, smaller compacts could be held at this temperature for a shorter period of time, e.g., 10 minutes.)

The body was then cooled in about 1 hour by cooling the furnace to 600° C. at a controlled rate of about 50° per minute for 30 minutes. Then, the furnace was turned off, and allowed to cool at its own rate to room temperature. The final dimensions for the body were: OD 3.86 cm; ID 1.25 cm; and thickness 0.93 cm. The weight was 144.1 gm, and the density of the compact was 14.8 g/cc. An elemental analysis revealed that the compact was 93.88% tungsten and 6.12% carbon. Thus, the tungsten/carbon ratio was almost exactly stoichiometric in this example, the carbon content being very slightly below the stoichiometric proportion of 6.13%.

EXAMPLE II

Essentially the same process as described in Example I was followed, but the starting material was Dow's SARAN-216. The initial weight of the preform was 166.0 grams, and its initial density was 4.87 g/cc. The final weight was 140.6 grams after densifying the body by heating, and the final density was 14.5 g/cc.

EXAMPLE III

Particles of SARAN-A were mixed with Fansteel tungsten, in the proportions of 18.4 grams of tungsten and 5 grams of SARAN-A. A portion of the mixture weighing 5 grams was compacted at 100,000 psi in the shape of a disk having a diameter of 1.27 cm and a thickness of 0.708 cm. The density of this preform was 5.56 g/cc. This sample was initially heated to about 165° C. to evolve HCl; it cracked at this temperature. (Similar samples formed at a much lower compacting pressure, e.g., 30,000 psi, have remained intact.) The remaining steps of the process were completed, and the fragments of the disk had a density of 14.8 g/cc.

EXAMPLE IV

A mixture of tungsten and SARAN-A was prepared in order to deliberately provide a product whose carbon content was greater than stoichiometric by approximately 1 atomic percent. Several specimens were completely processed, and they gave an average density (after heating for 10 minutes at 2200° C.) of 13.3 g/cc; the carbon content was slightly below stoichiometric gave an average density of 13.9 g/cc.

EXAMPLE V

A mixture of tungsten and SARAN-A was suitably prepared, and portions of it were pressed in a ram mold at various pressures, from 5000 to 100,000 psi. The green densities of the compacts varied from 4.4 g/cc for those pressed at 5000 psi to 4.9 g/cc for those pressed at 100,000 psi. The final densities varied from an average of 13.2 g/cc for the 5000 psi disks to an average of 13.9 g/cc for the 100,000 psi disks. Compacting pressures greater than 10,000 psi appeared to have very little effect on the final density.

Recapitulating somewhat, and with general reference to all of the experiments, the compacted green bodies were rapidly heated to the temperature at which significant dehydrohalogenation occurs. This temperature varies with polymer or copolymer type and source, but it generally lies in the range of 120° to 170° C. By the time a specimen has reached 140° C. -150° C., it must be protected by an inert gas such as nitrogen. A heating rate to produce significant dehydrohalogenation is evidenced by the change in color from a steel gray to black, preferably beginning within a few minutes and extending to no more than a few hours, with the steady indication of hydrogen chloride evolution; such HCl evolution can be determined via a wet litmus test, or simply by personal detection of the characteristicly sharp HCl odor. For pure polyvinylidene chloride, e.g., Saran A, significant dehydrohalogenation normally occurs in the range 150°–170° C., but it may be lowered if catalytic additives or other impurities are present. For the laboratory-synthesized polymer used in Example 1, this temperature range is 120°135° C. In the temperature range at which this significant dehydrohalogenation rate is manifested, the polymer will not deform without application of considerable stress. Thus, free-standing bodies will not become misshapen or deformed. However, if the dehydrohalogenation rate exceeds the rate at which gradual HCl diffusion through the green body can occur, internal stresses develop, and these stresses can be severe enough to cause the sample to bulge and even crack if there is too much of a stress-gradient established between the interior and the outer surface of the part. As the size of the part and more specifically the diffusion paths of the evolved gas increase, it becomes necessary to employ slower heating rates throughout the thermal decomposition range. For parts such as those described in Example I, a hold at about 134° C. was required to complete the desired weight loss, corresponding to a decomposition of about 20–30% of the polymeric material. The body becomes more porous and more thermally conductive as the degree of weight loss increases; consequently, the baking rate can be gradually increased.

The part is next heated to approximately 145°–150° C., at which time a nitrogen flow over the part should be initiated, if it has not already been established. A hold at this temperature is advantageously maintained until a weight loss of approximately 40% (based on the original polymer weight) has been achieved, at which time the baking rate may be safely increased to about 10° C. per hour to 300°–350° C. A thermal hold should be maintained at this temperature range in order to promote thorough sublimation of the tungsten oxychlorides. The length of dwell time at 300–350° C. is obviously a function of part size, and more specifically it is a function of the diffusion path length for internally evolved gases.

The baking rate can then be safely increased to 50°–100° C./hr and the samples heated to 800°–1050° C. If the initial baking and the densifying by heating steps are to be accomplished in the same furnace, there is no need to cool the samples after baking; they can be heated directly to 2000° C. Vacuum heating, at temperatures approaching 2000° C. has been found to provide better densities than heating in an inert atmosphere; and a desirable vacuum range is $10^{-4}$ to $10^{-5}$ Torr. If after baking there is a requirement to perform machining or the like in order to "clean up" the part tolerances, or to give the part a configuration which is not practical with isostatic pressing alone, machining may be readily performed on the baked part before densifying by heating. The final processing of the baked carbide should be performed as quickly as practicable, since some deactivation of the densification by heating parameter will occur in air. Ideally, any machining or inspecting operation requiring more than a few minutes to an hour should be done under an inert, protective atmosphere, e.g., nitrogen or argon.

If it should be desired to prepare a composite body which is *not* pure tungsten carbide, it has been found that refractory metal carbides of other materials (such as tantalum and titanium) in powdered form can be admixed with the carbon precursor and metal particles during the initial mixing step. Tantalum carbide may be desirable as a "filler" because it is generally less brittle than other carbides; and titanium carbide may be desirable as a "filler" because of its low specific gravity. While the *metals* tantalum and titanium would be attacked by the HCl gas that evolves when the carbon precursor decomposes, the carbides of these two metals are inert to such attack. Hence, including as much as 50% (by volume) of powdered refractory carbides within the initial mixture will produce a mixed carbide body when the process of the invention is practiced. In effect, then, the tungsten carbide achieved by this process serves to hold the other metal carbide in the body. Such mixed carbides generally cannot be brought to full theoretical density; but they can produce excellent carbide bodies with characteristics that are superior to many other carbides made with binders and the like. For example, a mixed tungsten carbide-titanium carbide body (1 to 1 by volume) has been made having a specific gravity in excess of 90% of theoretical, and a microhardness greater than 2000 DPH — which is greater than the hardness for pure tungsten carbide.

While only the preferred embodiments of the invention have been disclosed in great detail herein, it will be apparent to those skilled in the art that modifications thereof can be made without departing from the spirit of the invention. Thus, the specific methods shown herein are intended to be exemplary and are not meant to be limiting, except as described in the claims appended hereto.

What is claimed is:

1. The method of preparing a very dense tungsten carbide body, consisting essentially of the steps of:
   (a) preparing a mixture of carbon precursor and finely powdered tungsten, wherein the precursor is a vinylidene chloride based polymeric material, and wherein the ratio of the carbon component of the precursor and the metallic tungsten is substantially stoichiometric;
   (b) blending the mixture to obtain an intimate and uniform mixture of the carbon precursor and powdered metal;
   (c) removing moisture, if any, which has accumulated upon particles of the mixture;
   (d) compressing the mixture to form a self-supporting green body of a desired shape;
   (e) heating the green body to a temperature at which significant dehydrohalogenation beings;
   (f) subsequently heating the green body at a uniform and slow rate to accomplish significant dehydrohalogenation without polymeric material melting or puffing, until a weight loss of about 20% of the polymeric material has occurred;
   (g) further heating the green body in order to remove such metal oxides as are present, with removal being accomplished by the formation of sublimable metal oxychlorides and chlorides, with said heating being sufficiently gradual that the temperature differential within the body is held to no more than 5° C., until a weight loss of approximately 50% has been achieved;
   (h) further heating the body at an average rate no greater than about 50° C. per hour to a temperature within the range of about 800°-1300° C.; and
   (i) subsequently densifying the body by heating the body at about 2000° C. for at least 10 minutes in an inert or evacuated environment.

2. The process as claimed in claim 1 wherein the tungsten powder which is mixed with the carbon precursor consists essentially of particles having a Fisher sub-seive size of about 1 micron.

3. The method as claimed in claim 1 wherein the carbon precursor is a copolymer of vinylidene chloride and vinyl chloride.

4. The method as claimed in claim 1 wherein the carbon precursor is essentially 100% polyvinylidene chloride.

5. The method as claimed in claim 1 wherein the carbon precursor is a copolymer of vinylidene chloride and acrylonitrile.

6. The method as claimed in claim 5 wherein the vinylidene chloride comprises from 30 to 95 percent of the copolymer.

7. The method as claimed in claim 1 wherein the mixture is blended in a ball mill with a benzene vehicle, and the milled mixture is then freeze-dried to provide a free-flowing powder.

8. The method as claimed in claim 1 wherein the mixture is blended in a tungsten-lined ball mill and tungsten carbide balls are employed to accomplish the milling, whereby contamination of the ingredients from the walls of the mill is minimized.

9. The method as claimed in claim 1 wherein the intimate mixture of the carbon precursor and powdered metal is isostatically pressed at a pressure within the range of about 2,000 to 30,000 psi to form the green body.

10. The method as claimed in claim 1 and including the additional step of machining the body to achieve a desired configuration after the body has been heated to 800°-1300° C. but before it is densified by heating at about 2,000° C.

11. The method as claimed in claim 1, wherein the ratio of carbon precursor to tungsten falls within a range from one in which the carbon component of the precursor is in essentially stoichiometric relation to the metallic tungsten, to one in which there is a deficiency of 1 atomic percent of the carbon component as compared with an essentially stoichiometric material.

12. The method of preparing a very dense tungsten carbide body, including the steps of:
   (a) preparing a green body from mixture of a carbon precursor and finely powdered tungsten, wherein the precursor is a vinylidene chloride based polymeric material, the ratio of carbon precursor to metallic tungsten falling within the range from one in which the carbon compnent of the carbon precursor is in essentially stoichiometric relation to the metallic tungsten to one in which there is a deficiency of one atomic percent of the carbon component as compared with an essentially stoichiometric mixture;
   (b) removing moisture, if any, which has accumulated upon particles of the mixture;
   (c) initially heating the green body at a controlled rate to effect partial decomposition of the polymer so as to evolve HCl gas to cleanse the powdered tungsten of surface contamination;
   (d) subsequently heating the green body to an intermediate temperature to effect complete decomposition of the polymeric material and to drive off all volatile oxychlorides and chlorides;
   (e) subsequently baking the green body at an elevated temperature near 1000° C. for converting all of the powdered metal to a stable but relatively low density carbide; and (f) subsequently heating the carbide body at a temperature of about 2000° C. in an inert or evacuated environment to convert the relatively low density carbide into relatively high density carbide.

13. The method of preparing a carbide body as claimed in claim 12 and further including the step of cooling the body to essentially room temperature after it has been baked and fully converted to a low density metal carbide, but prior to the heating step that converts it to its high-density form so that it may be examined and inspected in air.

14. The method of preparing a carbide body as claimed in claim 12 and further including the step of machining the carbide body to a desired configuration after it has been baked to its stable and low-density form but prior to the heating step that converts it to its high-density form.

15. The method of preparing a carbide body as claimed in claim 12 wherein the carbon precursor is selected from the group consisting of: polyvinylidene chloride; a copolymer of vinylidene chloride and vinyl chloride; and a copolymer of vinylidene chloride and acrylonitrile.

16. The method of preparing a carbide body as claimed in claim 12 wherein the green body is formed by isostatically pressing the mixture at a pressure within the range of 2000 to 30,000 psi.

17. The method of preparing a carbide body as claimed in claim 12 wherein a filler is admixed with the powdered metal and the carbon precursor, with the filler consisting of a finely divided refractory metal carbide which is immune to attack by HCl gas, and the filler constituting no more than 50% of the body, by volume.

18. The method of preparing a very dense tungsten carbide body, consisting essentially of the steps of:

(a) preparing a stoichiometric mixture of a carbon precursor and finely powdered tungsten, wherein the carbon precursor is a vinylidene chloride-based polymeric material, the carbon precursor being a precursor of a quantity of carbon which is in substantially stoichiometric ratio to the metallic tungsten;

(b) blending the mixture to obtain an intimate and uniform mixture of the carbon precursor and powdered metal;

(c) removing moisture, if any, which has accumulated upon particles of the mixture;

(d) compressing the mixture to form a self-supporting green body of a desired shape;

(e) heating the green body to a temperature at which significant dehydrohalogenation begins;

(f) subsequently heating the green body at a uniform and slow rate to accomplish significant dehydrohalogenation without polymeric material melting or puffing, until at least 20% of the polymeric material has decomposed;

(g) further heating the green body in order to remove such metal oxides as are present, with removal being accomplished by the formation of volatile tungsten oxychlorides and chlorides, with said heating being gradual enough such that the temperature differential within the body is held to no more than 5° C., until a weight loss of approximately 50% of the polymeric material has been achieved;

(h) further heating the body at an average rate no greater than about 50° C. per hour to a temperature within the range of about 800°–1050° C.; and (i) subsequently densifying the body by heating the body at about 2,000° C. for about 10 minutes in an inert or evacuated environment.

* * * * *